United States Patent
Zhang

(10) Patent No.: US 10,361,956 B2
(45) Date of Patent: Jul. 23, 2019

(54) TRAFFIC FLOW FORWARDING PATH REDIRECTION METHOD AND APPARATUS, AND TRAFFIC FLOW FORWARDING SYSTEM

(71) Applicant: Huawei Technologies Co., Ltd., Shenzhen (CN)

(72) Inventor: Yongping Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 79 days.

(21) Appl. No.: 15/863,362

(22) Filed: Jan. 5, 2018

(65) Prior Publication Data

US 2018/0131615 A1 May 10, 2018

Related U.S. Application Data

(63) Continuation of application No. PCT/CN2016/087305, filed on Jun. 27, 2016.

(30) Foreign Application Priority Data

Oct. 28, 2015 (CN) .......................... 2015 1 0715818

(51) Int. Cl.
*H04L 12/46* (2006.01)
*H04L 12/803* (2013.01)
(Continued)

(52) U.S. Cl.
CPC ........ *H04L 47/122* (2013.01); *H04L 12/4633* (2013.01); *H04L 12/4641* (2013.01);
(Continued)

(58) Field of Classification Search
CPC ... H04L 12/803; H04L 12/721; H04L 47/122; H04L 48/38; H04L 12/4633; H04L 45/50; H04L 12/4641; H04L 45/02
See application file for complete search history.

(56) References Cited

U.S. PATENT DOCUMENTS

2007/0041326 A1    2/2007   Babiarz et al.
2010/0328251 A1*  12/2010   Sinclair ................... G06F 3/016
                                                           345/174
(Continued)

FOREIGN PATENT DOCUMENTS

CN         101997728 A        3/2011
CN         102820987 A       12/2012
(Continued)

OTHER PUBLICATIONS

Machine Translation and Abstract of Chinese Publication No. CN102820987, Dec. 12, 2012, 31 pages.
(Continued)

*Primary Examiner* — Chi Ho A Lee
(74) *Attorney, Agent, or Firm* — Conley Rose, P.C.

(57) ABSTRACT

A traffic flow forwarding path redirection method and apparatus, and a traffic flow forwarding system, where the method includes determining a redirection parameter of a virtual network element through which a traffic flow passes, where the virtual network element includes a plurality of physical network elements, establishing, according to a topological relationship of the physical network elements in the virtual network element, a redirection path to forward the traffic flow between an inbound interface of a start physical network element and an outbound interface of an end physical network element, generating tunnel forwarding information of the redirection path, and sending, to the physical network elements on the redirection path, packet labels respectively corresponding to the physical network elements. Hence, a traffic flow forwarding path redirection process is simplified.

20 Claims, 7 Drawing Sheets

(51) Int. Cl.
*H04L 12/751* (2013.01)
*H04L 12/721* (2013.01)
*H04L 12/723* (2013.01)
*H04L 12/707* (2013.01)

(52) U.S. Cl.
CPC .............. *H04L 45/02* (2013.01); *H04L 45/22* (2013.01); *H04L 45/38* (2013.01); *H04L 45/50* (2013.01)

(56) References Cited

U.S. PATENT DOCUMENTS

| | | | | |
|---|---|---|---|---|
| 2011/0299537 | A1* | 12/2011 | Saraiya | H04L 61/2596 370/392 |
| 2012/0294617 | A1* | 11/2012 | Miyamura | H04L 41/12 398/79 |
| 2013/0286844 | A1 | 10/2013 | Ishizuka | |
| 2014/0099119 | A1* | 4/2014 | Wei | H04J 14/0257 398/79 |
| 2014/0195666 | A1* | 7/2014 | Dumitriu | H04L 12/4625 709/223 |
| 2014/0301192 | A1* | 10/2014 | Lee | H04L 47/10 370/230 |
| 2015/0134851 | A1* | 5/2015 | Relan | H04L 45/126 709/241 |
| 2016/0006837 | A1* | 1/2016 | Reynolds | H04W 84/18 709/203 |
| 2016/0182363 | A1 | 6/2016 | Li et al. | |
| 2016/0277355 | A1* | 9/2016 | Shetty | H04L 12/4633 |
| 2017/0026387 | A1* | 1/2017 | Vissamsetty | H04L 63/1408 |
| 2017/0280253 | A1* | 9/2017 | Oplinger | H04R 25/407 |
| 2017/0317780 | A1* | 11/2017 | Wood | H04J 14/0286 |
| 2018/0041380 | A1* | 2/2018 | Lin | H04L 41/0654 |

FOREIGN PATENT DOCUMENTS

| | | |
|---|---|---|
| CN | 103283191 A | 9/2013 |
| CN | 103782552 A | 5/2014 |
| EP | 1601143 A1 | 11/2005 |
| EP | 2804343 A1 | 11/2014 |

OTHER PUBLICATIONS

Foreign Communication From a Counterpart Application No. PCT/CN2016/087305, English Translation of International Search Report dated Sep. 30, 2016, 2 pages.
Foreign Communication From a Counterpart Application, PCT Application No. PCT/CN2016/087305, English Translation of International Search Report dated Sep. 30, 2016, 2 pages.
Machine Translation and Abstract of Chinese Publication No. CN101997728, Mar. 30, 2011, 16 pages.
Foreign Communication From a Counterpart Application, Chinese Application No. 201510715818.6, Chinese Office Action dated Mar. 1, 2019, 4 pages.
Foreign Communication From a Counterpart Application, Chinese Application No. 201510715818.6, Chinese Search Report dated Feb. 14, 2019, 2 pages.
Foreign Communication From a Counterpart Application, European Application No. 16858712.9, Extended European Search Report dated Jul. 12, 2018, 7 pages.

* cited by examiner

A first physical network element in a virtual network element receives, from a redirection apparatus, information about a redirection path and information about a protection path, where the redirection path and the protection path are established between an inbound interface of a start physical network element and an outbound interface of an end physical network element according to a topological relationship of multiple physical network elements in the virtual network element and a redirection parameter, the redirection parameter is used to indicate the inbound interface of the start physical network element and the outbound interface of the end physical network element, the multiple physical network elements include the start physical network element and the end physical network element, and the first physical network element is the start physical network element — S510

The first physical network element determines a link status of the redirection path, and when the link status of the redirection path is unavailable, specifies the protection path as a new redirection path — S520

FIG. 5

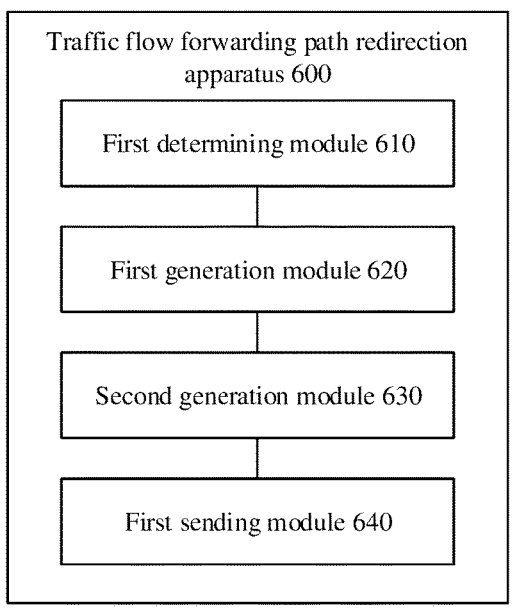

FIG. 6

TRAFFIC FLOW FORWARDING PATH REDIRECTION METHOD AND APPARATUS, AND TRAFFIC FLOW FORWARDING SYSTEM

CROSS-REFERENCE TO RELATED APPLICATIONS

This application is a continuation of International Patent Application No. PCT/CN2016/087305 filed on Jun. 27, 2016, which claims priority to Chinese Patent Application No. 201510715818.6 filed on Oct. 28, 2015. The disclosures of the aforementioned applications are hereby incorporated by reference in their entireties.

TECHNICAL FIELD

The present application relates to the communications field, and in particular, to a traffic flow forwarding path redirection method and apparatus, and a traffic flow forwarding system.

BACKGROUND

With development of network technologies, network virtualization and network centralized control gain more attention, and are widely applied. Virtualization may be understood as a resource management technology. Various physical resources of a computer, such as a server, a network, a memory, and a storage are abstracted, converted, and then presented. In this way, a barrier that a physical structure and a function are inseparable can be broken, and a user may use these resources in a manner better than an original configuration, without excessive restrictions from physical hardware.

In a network using a virtualization technology, traffic flow forwarding is presented to a user in a virtual network element form. Further, a virtual network element may include multiple physical network elements, or in other words, a virtual network element may be obtained by virtualizing multiple physical network elements. When an original forwarding path of a traffic flow needs to be modified in a virtual network element due to a service requirement (for example, Internet Protocol (IP) Security (IPsec)) monitoring needs to be performed on the traffic flow), a redirection path may be deployed on the virtual network element to ensure normal processing of the traffic flow.

However, in some other approaches, when a redirection path of a traffic flow is to be deployed inside a virtual network element, a configuration parameter of each physical network element needs to be separately configured inside the virtual network element according to a topological relationship inside the virtual network element (for example, an IP routing table of each physical network element needs to be modified) in order to determine the redirection path. In this way, a packet of the traffic flow can be forwarded along the redirection path. This static configuration manner of a redirection path requires professional technical personnel to spend a large amount of time to complete, and a workload is heavy and a process is complex.

SUMMARY

Embodiments of the present application provide a traffic flow forwarding path redirection method and apparatus, and a traffic flow forwarding system in order to simplify a traffic flow redirection process in a virtual network element.

According to a first aspect, a traffic flow forwarding path redirection method is provided, including determining, by a redirection apparatus, a redirection parameter of a virtual network element through which a traffic flow passes, where the virtual network element includes multiple physical network elements, the redirection apparatus is configured to redirect a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element, establishing, by the redirection apparatus according to a topological relationship of the multiple physical network elements in the virtual network element and the redirection parameter, a redirection path that is used to forward the traffic flow and that is between the inbound interface of the start physical network element and the outbound interface of the end physical network element, generating, by the redirection apparatus, tunnel forwarding information of the redirection path, where the tunnel forwarding information of the redirection path includes a first packet label corresponding to each physical network element in at least two physical network elements on the redirection path, and the at least two physical network elements on the redirection path are a subset of the multiple physical network elements, and sending, by the redirection apparatus to the at least two physical network elements on the redirection path, the first packet labels respectively corresponding to the at least two physical network elements such that the at least two physical network elements on the redirection path forward a packet in the traffic flow on the redirection path in a tunnel manner.

With reference to the first aspect, in an implementation of the first aspect, the method further includes establishing, by the redirection apparatus according to the topological relationship of the multiple physical network elements in the virtual network element and the redirection parameter, a protection path between the inbound interface of the start physical network element and the outbound interface of the end physical network element, where the protection path is used to forward the traffic flow when a link status of the redirection path is unavailable, generating, by the redirection apparatus, tunnel forwarding information of the protection path, where the tunnel forwarding information of the protection path includes a second packet label corresponding to each physical network element in at least two physical network elements on the protection path, and the at least two physical network elements on the protection path are a subset of the multiple physical network elements, and sending, by the redirection apparatus to the at least two physical network elements on the protection path, the second packet labels respectively corresponding to the at least two physical network elements such that the at least two physical network elements on the protection path forward a packet in the traffic flow on the protection path in the tunnel manner when the link status of the redirection path is unavailable.

With reference to either of the first aspect and the foregoing implementation of the first aspect, in another implementation of the first aspect, establishing, by the redirection apparatus according to a topological relationship of the multiple physical network elements in the virtual network element and the redirection parameter, a redirection path that is used to forward the traffic flow and that is between the inbound interface of the start physical network element and the outbound interface of the end physical network element includes establishing, by the redirection apparatus according to the topological relationship of the multiple physical network elements in the virtual network element, the redirection parameter, and a link status between the physical network elements in the virtual network element, the redirection path that is used to forward the traffic flow and that is between the inbound interface of the start physical network element and the outbound interface of the end physical network element, where the link status includes a faulty state and/or a congested state of a link between the multiple physical network elements in the virtual network element.

With reference to any one of the first aspect or the foregoing implementations of the first aspect, in another implementation of the first aspect, the first packet label includes a first packet label of an inbound interface of each physical network element on the redirection path and/or a first packet label of an outbound interface of each physical network element on the redirection path, and the second packet label includes a second packet label of an inbound interface of each physical network element on the protection path and/or a second packet label of an outbound interface of each physical network element on the protection path.

With reference to any one of the first aspect or the foregoing implementations of the first aspect, in another implementation of the first aspect, the redirection apparatus is a centralized controller of a network in which the virtual network element locates.

According to a second aspect, a traffic flow forwarding path redirection method is provided, including receiving, by a first physical network element in a virtual network element from a redirection apparatus, information about a redirection path and information about a protection path, where the redirection path and the protection path are established between an inbound interface of a start physical network element and an outbound interface of an end physical network element according to a topological relationship of multiple physical network elements in the virtual network element and a redirection parameter, the redirection parameter is used to indicate the inbound interface of the start physical network element and the outbound interface of the end physical network element, the multiple physical network elements include the start physical network element and the end physical network element, and the first physical network element is the start physical network element, and determining, by the first physical network element, a link status of the redirection path, and specifying the protection path as a new redirection path when the link status of the redirection path is unavailable.

With reference to the second aspect, in an implementation of the second aspect, the link status of the redirection path includes a faulty state and/or a congested state of a link between at least two physical network elements on the redirection path, and the at least two physical network elements on the redirection path are a subset of the multiple physical network elements.

According to a third aspect, a traffic flow forwarding path redirection apparatus is provided, including a determining module configured to determine a redirection parameter of a virtual network element through which a traffic flow passes, where the virtual network element includes multiple physical network elements, the redirection apparatus is configured to redirect a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element, a first generation module configured to establish, according to a topological relationship of the multiple physical network elements in the virtual network element and the redirection parameter, a redirection path that is used to forward the traffic flow and that is between the inbound interface of the start physical network element and the outbound interface of the end physical network element, a second generation module configured to generate tunnel forwarding information of the redirection path, where the tunnel forwarding information includes a first packet label corresponding to each physical network element in at least two physical network elements on the redirection path, and the at least two physical network elements on the redirection path are a subset of the multiple physical network elements, and a first sending module configured to send, to the at least two physical network elements on the redirection path, the first packet labels that are generated by the second generation module and that are respectively corresponding to the at least two physical network elements such that the at least two physical network elements on the redirection path forward a packet in the traffic flow on the redirection path in a tunnel manner.

With reference to the third aspect, in an implementation of the third aspect, the apparatus further includes a third generation module configured to establish, according to the topological relationship of the multiple physical network elements in the virtual network element and the redirection parameter, a protection path between the inbound interface of the start physical network element and the outbound interface of the end physical network element, where the protection path is used to forward the traffic flow when a link status of the redirection path is unavailable, a fourth generation module configured to generate tunnel forwarding information of the protection path, where the tunnel forwarding information of the protection path includes a second packet label corresponding to each physical network element in the at least two physical network elements on the protection path, and a second sending module configured to send, to the at least two physical network elements on the protection path, the second packet labels respectively corresponding to the at least two physical network elements such that the at least two physical network elements on the protection path forward a packet in the traffic flow on the protection path in the tunnel manner when the link status of the redirection path is unavailable.

With reference to either of the third aspect and the foregoing implementation of the third aspect, in another implementation of the third aspect, the first generation module is further configured to establish, according to the topological relationship of the multiple physical network elements in the virtual network element, the redirection parameter, and a link status between the physical network elements in the virtual network element, the redirection path that is used to forward the traffic flow and that is between the inbound interface of the start physical network element and the outbound interface of the end physical network element, where the link status includes a faulty state and/or a congested state of a link between the multiple physical network elements in the virtual network element.

With reference to any one of the third aspect or the foregoing implementations of the third aspect, in another implementation of the third aspect, the first packet label includes a first packet label of an inbound interface of each physical network element on the redirection path and/or a first packet label of an outbound interface of each physical network element on the redirection path, and the second packet label includes a second packet label of an inbound interface of each physical network element on the protection path and/or a second packet label of an outbound interface of each physical network element on the protection path.

With reference to any one of the third aspect or the foregoing implementations of the third aspect, in another implementation of the third aspect, the apparatus is a centralized controller of a network in which the virtual network element locates.

According to a fourth aspect, a first physical network element is provided, including a receiving module configured to receive, from a redirection apparatus, information about a redirection path and information about a protection path, where the first physical network element belongs to a virtual network element, the virtual network element includes multiple physical network elements, the redirection path and the protection path are established between an inbound interface of a start physical network element and an outbound interface of an end physical network element according to a topological relationship of the multiple physical network elements in the virtual network element and a redirection parameter, the redirection parameter is used to indicate the inbound interface of the start physical network element and the outbound interface of the end physical network element, the multiple physical network elements include the start physical network element and the end physical network element, and the first physical network element is the start physical network element and a determining module configured to determine a link status of the redirection path, and specify the protection path as a new redirection path when the link status of the redirection path is unavailable.

With reference to the fourth aspect, in an implementation of the fourth aspect, the link status of the redirection path includes a faulty state and/or a congested state of a link between at least two physical network elements on the redirection path, and the at least two physical network elements on the redirection path are a subset of the multiple physical network elements.

According to a fifth aspect, a traffic flow forwarding system is provided, including a redirection apparatus and a first physical network element, the redirection apparatus is any redirection apparatus according to the third aspect, and the first physical network element is the first physical network element according to the fourth aspect.

In the embodiments of the present application, the redirection path and tunnel information of the redirection path can be automatically determined according to the obtained redirection parameter such that the traffic flow is forwarded on the redirection path in a tunnel forwarding manner, without a need to separately modify a configuration parameter of each physical network element on the redirection path. This simplifies the traffic flow redirection process in the virtual network element.

BRIEF DESCRIPTION OF DRAWINGS

To describe the technical solutions in the embodiments of the present application more clearly, the following briefly describes the accompanying drawings required for describing the embodiments of the present application. The accompanying drawings in the following description show merely some embodiments of the present application, and a person of ordinary skill in the art may still derive other drawings from these accompanying drawings without creative efforts.

FIG. 5 is a schematic flowchart of a traffic flow forwarding path redirection method according to another embodiment of the present application;

FIG. 6 is a schematic block diagram of a traffic flow forwarding path redirection apparatus according to an embodiment of the present application;

DESCRIPTION OF EMBODIMENTS

The following clearly describes the technical solutions in the embodiments of the present application with reference to the accompanying drawings in the embodiments of the present application. The described embodiments are some but not all of the embodiments of the present application. All other embodiments obtained by a person of ordinary skill in the art based on the embodiments of the present application without creative efforts shall fall within the protection scope of the present application.

Figure 1:
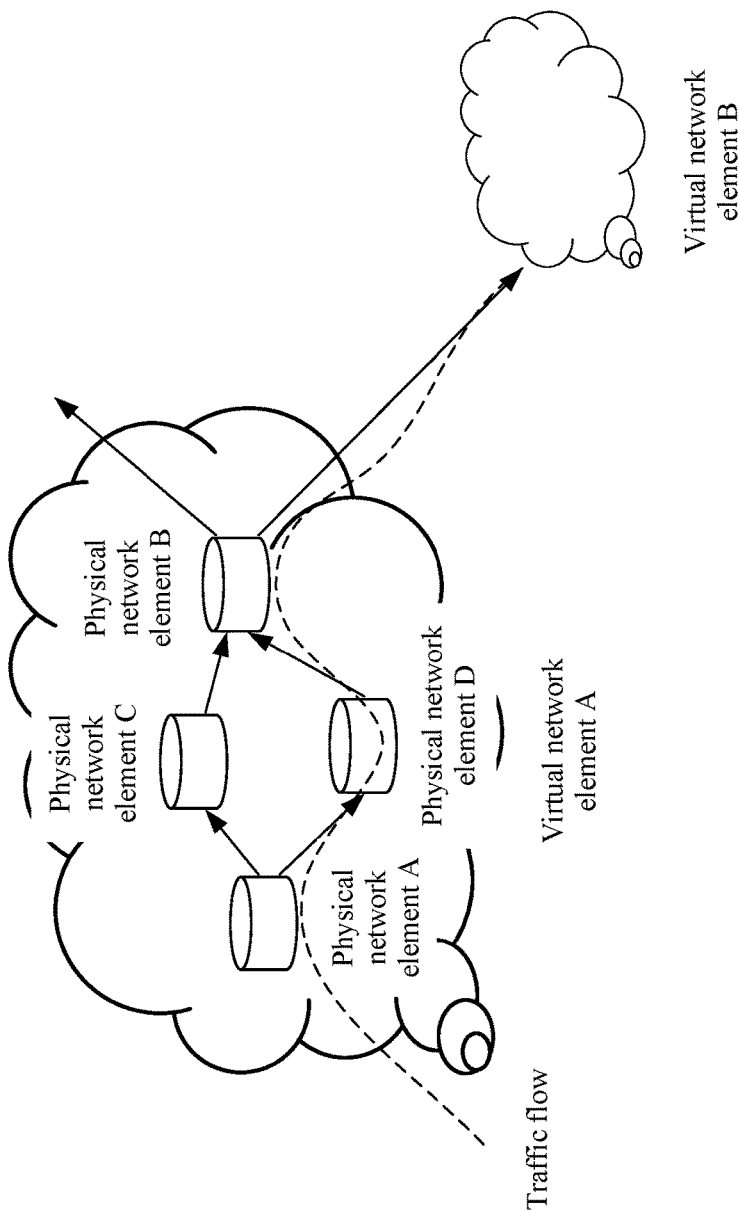
FIG. 1 is a schematic diagram of a traffic flow forwarding scenario based on a virtual network element.

For ease of understanding, a traffic flow forwarding scenario based on a virtual network element is briefly described first with reference to FIG. 1. As described above, a traffic flow forwarding system using a virtualization technology is presented to a user in a virtual network element form. Referring to FIG. 1, a traffic flow successively passes a virtual network element A and a virtual network element B in a network. Each virtual network element includes multiple physical network elements (or each virtual network element is obtained by virtualizing multiple physical network elements). For example, the virtual network element A includes multiple physical network elements such as a physical network element A, a physical network element B, a physical network element C, and a physical network element D. It is assumed that a current forwarding path (not shown) that is of the traffic flow and that is in the virtual network element A needs to be redirected due to a service requirement (for example, IPsec monitoring needs to be performed on the traffic flow), that is, a redirection path (a path shown by a dashed line in FIG. 1) needs to be determined to maintain continuity of the traffic flow. In the other approaches, this redirection path needs to be manually determined, and configuration parameters of the physical network element A, the physical network element D, and the physical network element B need to be manually and separately modified (for example, IP routing tables of these physical network elements need to be separately modified). This is time and labor consuming. The following describes a traffic flow forwarding path redirection method according to an embodiment of the present application with reference to FIG. 2.

Figure 2:
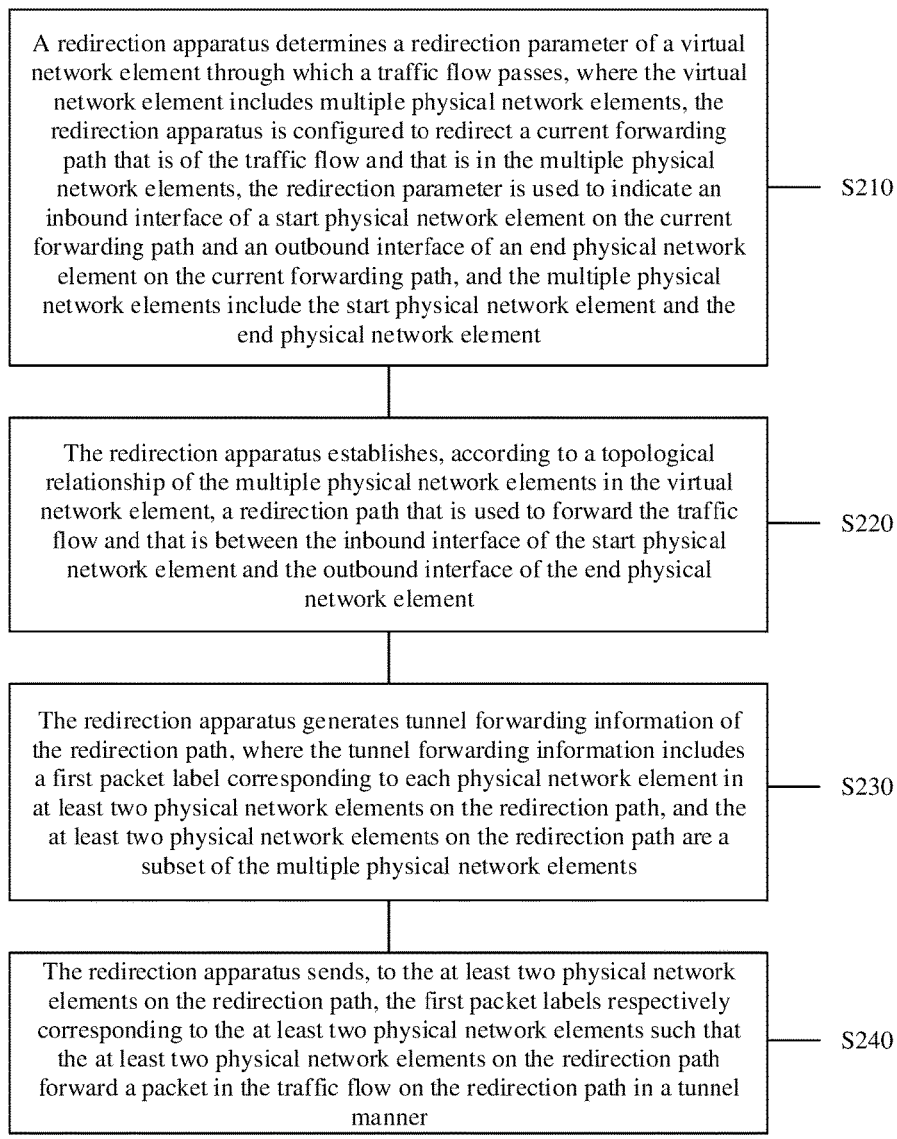
FIG. 2 is a schematic flowchart of a traffic flow forwarding path redirection method according to an embodiment of the present application.

FIG. 2 is a schematic flowchart of a traffic flow forwarding path redirection method according to an embodiment of the present application. The method of FIG. 2 may be executed by a controller of a network in which a virtual network element locates. The controller may be independently deployed, or may be deployed on a physical network element inside the virtual network element. The method of FIG. 2 includes the following steps.

Step S210: A redirection apparatus determines a redirection parameter of the virtual network element through which a traffic flow passes, where the virtual network element includes multiple physical network elements, the redirection apparatus is configured to redirect a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element.

Further, in step S210, that the foregoing virtual network element includes multiple physical network elements may be that the virtual network element is obtained by virtualizing multiple physical network elements. That the virtual network element is obtained by virtualizing multiple physical network elements may be understood that the overall network is presented to a user as a virtual network element with a routing and forwarding function. The multiple physical network elements provide bottom-layer hardware support for the virtual network element to implement the routing and forwarding function. For example, as shown in FIG. 1, the virtual network element A is obtained by virtualizing the physical network element A to the physical network element D.

It should be understood that the foregoing redirection parameter may be recorded in a pre-stored manner, or may be determined according to a destination IP address of a packet in the traffic flow. The foregoing start physical network element and the end physical network element may be two edge physical network elements through which the traffic flow passes in the virtual network element, that is, the traffic flow flows into the virtual network element from the inbound interface of the start physical network element, and flows out of the virtual network element from the outbound interface of the end physical network element.

It should be understood that a trigger condition for redirection is not limited in this embodiment of the present application. For example, the trigger condition may be that the current forwarding path of the traffic flow is faulty or congested, or a traffic flow forwarding path needs to be re-planned based on a deployment requirement of a network side.

Step S220: The redirection apparatus establishes, according to a topological relationship of the multiple physical network elements in the virtual network element, a redirection path that is used to forward the traffic flow and that is between the inbound interface of the start physical network element and the outbound interface of the end physical network element.

It should be understood that a forwarding interface indicated by the redirection parameter may be the inbound interface of the start physical network element and the outbound interface of the end physical network element.

Step S230: The redirection apparatus generates tunnel forwarding information of the redirection path, where the tunnel forwarding information includes a first packet label corresponding to each physical network element in at least two physical network elements on the redirection path, and the at least two physical network elements on the redirection path are a subset of the multiple physical network elements.

Further, in step S230, the packet label may be a label based on a Multiprotocol Label Switching (MPLS) protocol, or may be a label based on a Label Switched Path (LSP) protocol. This is not limited in this embodiment of the present application.

Step S240: The redirection apparatus sends, to the at least two physical network elements on the redirection path, the first packet labels respectively corresponding to the at least two physical network elements such that the at least two physical network elements on the redirection path forward a packet in the traffic flow on the redirection path in a tunnel manner.

It should be understood that the packet label in step S230 may be packet labels and/or a packet label of an inbound interface and/or an outbound interface of each physical network element that is on the redirection path and through which the traffic flow passes. After receiving the respectively corresponding packet labels, these physical network elements may identify and forward the packet in the traffic flow using the packet labels according to a tunneling protocol, without a need to modify configuration parameters (for example, modify IP routing tables) of the physical network elements as in the other approaches.

It should further be understood that, in step S230, the redirection apparatus may further determine, according to the redirection parameter of the virtual network element through which the traffic flow passes, whether an established forwarding path exists between the start physical network element and the end physical network element that are indicated by the redirection parameter. If a forwarding path exists and each link status on the forwarding path meets a condition for forwarding the traffic flow, the redirection apparatus does not need to re-establish a redirection path and can use the existing forwarding path as a redirection path to forward the traffic flow.

It should further be understood that the tunnel forwarding information in step S240 may be a tunnel forwarding table. In addition to the foregoing label information, the tunnel forwarding table may further include a tunnel identifier (ID), where when multiple tunnels are established, the tunnels can be differentiated based on tunnel IDs.

In step S240, the packet label corresponding to each physical network element on the redirection path except the start physical network element and the end physical network element may include a packet label corresponding to the inbound interface of each physical network element and a packet label corresponding to the outbound interface of each physical network element. A packet label corresponding to the end physical network element may include the packet label corresponding to the inbound interface of the end physical network element. In addition, a tunnel termination flag corresponding to the outbound interface of the end physical network element may further be sent to the end physical network element. The tunnel termination flag is used to instruct the end physical network element to terminate tunnel forwarding (for example, to decapsulate the packet of the traffic flow, and to remove a tunnel label in the packet).

In this embodiment of the present application, the redirection path and tunnel information of the redirection path can be automatically determined according to the obtained redirection parameter such that the traffic flow is forwarded on the redirection path in a tunnel forwarding manner, without a need to separately modify the configuration parameter of each physical network element on the redirection path. This simplifies a traffic flow redirection process in the virtual network element.

Optionally, as an embodiment, the method shown in FIG. 2 may further include establishing, by the redirection apparatus according to the topological relationship of the multiple physical network elements in the virtual network element and the redirection parameter, a protection path between the inbound interface of the start physical network element and the outbound interface of the end physical network element, where the protection path is used to forward the traffic flow when a link status of the redirection path is unavailable, generating, by the redirection apparatus, tunnel forwarding information of the protection path, where the tunnel forwarding information of the protection path includes second packet labels corresponding to at least two physical network elements on the protection path, and the at least two physical network elements on the protection path are a subset of the multiple physical network elements, and sending, by the redirection apparatus to the at least two physical network elements on the protection path, the second packet labels respectively corresponding to the at least two physical network elements such that the at least two physical network elements on the protection path forward a packet in the traffic flow on the protection path in the tunnel manner when the link status of the redirection path is unavailable.

In this embodiment of the present application, the redirection path and the protection path are determined using the redirection parameter. When the link status of the redirection path is unavailable, the traffic flow can be switched to the protection path in time. This ensures continuity of traffic flow forwarding. It should be understood that, that "the link status of the redirection path is unavailable" may include but is not limited to a link is faulty or link communication quality deteriorates and reaches a preset threshold.

It should be understood that the protection path and the redirection path may be established simultaneously, or may be separately established. This is not limited in this embodiment of the present application. It should further be understood that there may be multiple protection paths in this embodiment of the present application. When the redirection path is invalid, one protection path may be selected from the multiple protection paths according to a link status of each protection path, to continue to forward the traffic flow.

It should further be understood that the tunneling protocol used for transmitting the traffic flow may be a Layer 2 Tunneling Protocol or a Layer 3 Tunneling Protocol. The tunneling protocol may be selected by a user, or may be automatically determined. This is not limited in the present application.

It should further be understood that the redirection path and the protection path may include a same physical network element, and the physical network element may use a same packet label or different packet labels in the redirection path and the protection path. For example, it is assumed that both the redirection path and the protection path shown in FIG. 1 include the physical network element C. An inbound interface packet label used by the physical network element C in the redirection path and the protection path may be 100. Alternatively, an inbound interface packet label used by the physical network element C in the redirection path may be 100, and an inbound interface packet label used by the physical network element C in the protection path may be 200.

Optionally, as an embodiment, step S220 may include establishing, by the redirection apparatus according to the topological relationship of the multiple physical network elements in the virtual network element, the redirection parameter, and a link status between the physical network elements in the virtual network element, the redirection path that is used to forward the traffic flow and that is between the inbound interface of the start physical network element and the outbound interface of the end physical network element, where the link status includes a faulty state and/or a congested state of a link between the multiple physical network elements in the virtual network element.

In this embodiment of the present application, the redirection path is established according to the link status between the physical network elements such that the established redirection path is more proper.

Optionally, as an embodiment, the redirection path may be dynamically adjusted according to the topological relationship of the physical network elements in the virtual network element and a change situation of the link status between the physical network elements in the virtual network element.

Optionally, as an embodiment, the first packet label includes a first packet label of an inbound interface of each physical network element on the redirection path and/or a first packet label of an outbound interface of each physical network element on the redirection path, and the second packet label includes a second packet label of an inbound interface of each physical network element on the protection path and/or a second packet label of an outbound interface of each physical network element on the protection path.

Optionally, as an embodiment, the redirection apparatus is a centralized controller of the network in which the virtual network element locates. It should be understood that the redirection apparatus may also be deployed in any physical network element in the virtual network element.

Figure 3:
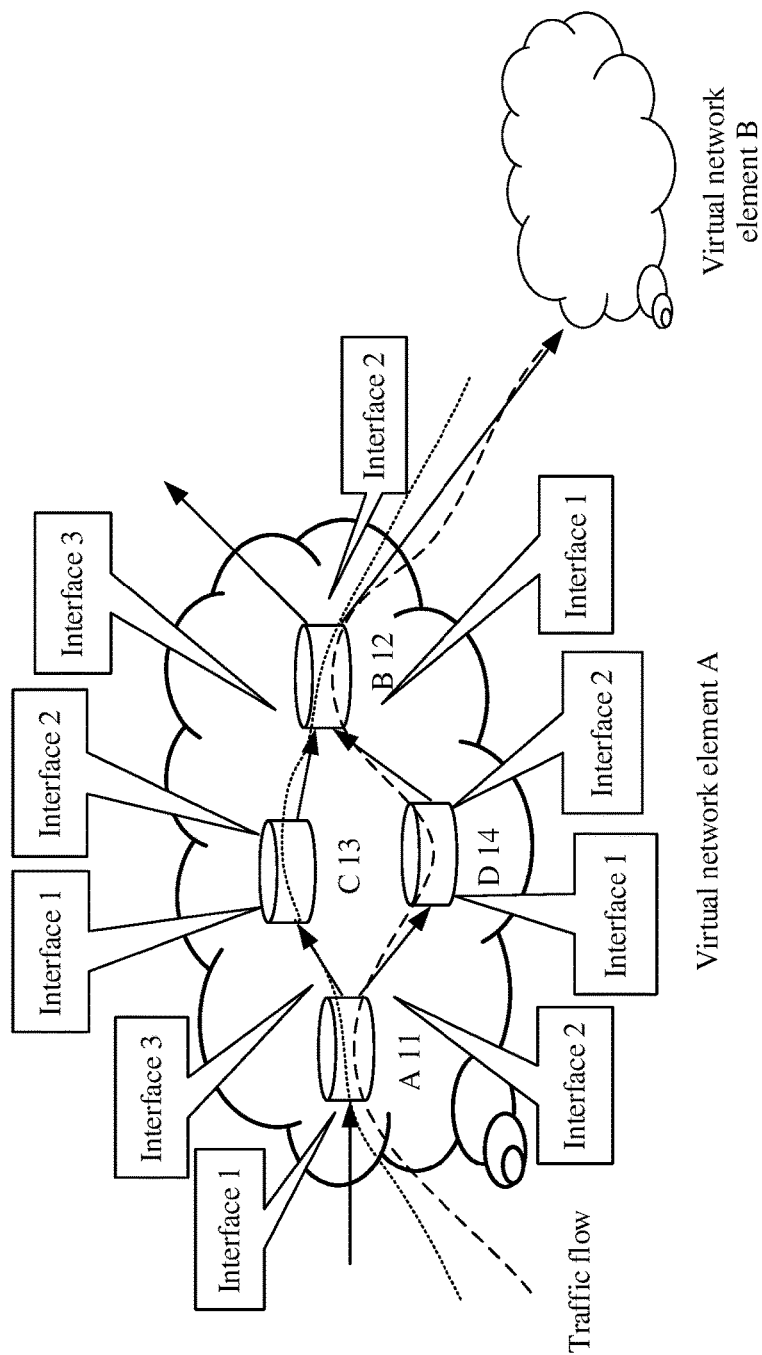
FIG. 3 is a schematic diagram of another traffic flow forwarding scenario based on a virtual network element.
Figure 4:
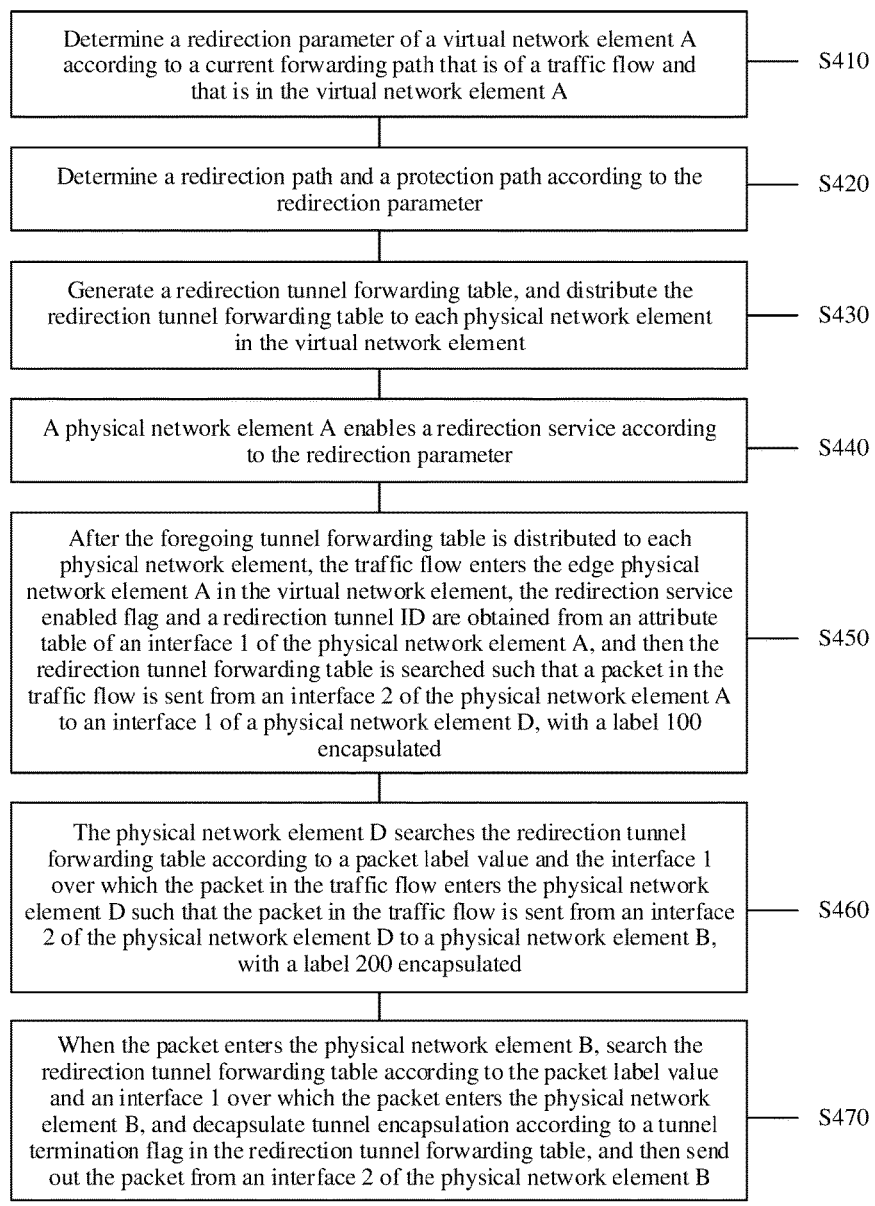
FIG. 4 is a schematic flowchart of a traffic flow forwarding path redirection method according to another embodiment of the present application.

The following describes, with reference to FIG. 4, a traffic flow forwarding path redirection method in an embodiment of the present application in greater detail using the scenario shown in FIG. 3 as an example. It should be understood that FIG. 4 is merely intended to help a person skilled in art understand this embodiment of the present application rather than restrict this embodiment of the present application to a specific scenario used as an example. A person skilled in the art can make various equivalent variations or modifications according to an example shown in FIG. 4, and such variations or modifications also fall within the scope of this embodiment of the present application.

FIG. 4 is a schematic flowchart of a traffic flow forwarding path redirection method according to an embodiment of the present application. The method of FIG. 4 is executed by a centralized controller of a network in which a virtual network element locates, and the method of FIG. 4 includes the following steps.

Step S410: Determine a redirection parameter of a virtual network element A according to a current forwarding path that is of a traffic flow and that is in the virtual network element A.

As shown in FIG. 3, in the virtual network element A, it is assumed that the traffic flow flows into the virtual network element A from an interface 1 of a physical network element A 11, and flows out of the virtual network element A from an interface 2 of a physical network element B 12. The redirection parameter may be as follows.

[ID of the physical network element A 11, interface 1] is redirected to [ID of the physical network element B 12, interface 2].

Step S420: Determine a redirection path and a protection path according to the redirection parameter.

The redirection path may be a path shown by a dashed line in FIG. 3, and the traffic flow passes through the physical network element A 11, a physical network element D 14, and the physical network element B 12 successively on the redirection path. The foregoing protection path may be a forwarding path including the physical network element A 11, a physical network element C 13, and the physical network element B 12 in FIG. 3.

Step S430: Generate a redirection tunnel forwarding table, and distribute the redirection tunnel forwarding table to each physical network element in the virtual network element.

Further, the redirection tunnel forwarding table may record an inbound interface and an outbound interface of each physical network element through which the traffic flow passes on the redirection path, and packet labels corresponding to these interfaces. The redirection tunnel forwarding table may further record an inbound interface and an outbound interface of each physical network element through which the traffic flow passes on the protection path, and packet labels corresponding to these interfaces.

It is assumed that, when the traffic flow is forwarded on the redirection path, the traffic flow successively passes through the interface 1 of the physical network element A 11, an interface 2 of the physical network element A 11, an interface 1 of the physical network element D 14, an interface 2 of the physical network element D 14, an interface 1 of the physical network element B 12, and the interface 2 of the physical network element B 12, and when the traffic flow is forwarded on the protection path, the traffic flow successively passes through the interface 1 of the physical network element A 11, an interface 3 of the physical network element A 11, an interface 1 of the physical network element C 13, an interface 2 of the physical network element C 13, an interface 3 of the physical network element B 12, and the interface 2 of the physical network element B 12. In addition, it is assumed that a tunnel ID corresponding to the redirection path is 1, and a tunnel ID corresponding to the protection path is 2. The foregoing redirection tunnel forwarding table may record tunnel information listed in Table 1 to Table 4.

TABLE 1

Physical network element A

| Tunnel ID | Outbound interface | Outbound interface packet label |
|---|---|---|
| 1 | Interface 2 | 100 |
| 2 | Interface 3 | 1000 |

TABLE 2

Physical network element C

| Inbound interface | Inbound interface packet label | Outbound interface | Outbound interface packet label |
|---|---|---|---|
| Interface 1 | 1000 | Interface 2 | 2000 |

TABLE 3

Physical network element D

| Inbound interface | Inbound interface packet label | Outbound interface | Outbound interface packet label |
|---|---|---|---|
| Interface 1 | 100 | Interface 2 | 200 |

TABLE 4

Physical network element B

| Inbound interface | Inbound interface packet label | Outbound interface | Tunnel termination flag |
|---|---|---|---|
| Interface 1 | 200 | Interface 2 | 1 |
| Interface 3 | 2000 | Interface 2 | 1 |

Step S440: A physical network element A enables a redirection service according to the redirection parameter.

The physical network element A 11 enables the redirection service in an attribute table of the interface 1 of the physical network element A 11 according to the redirection parameter: physical network element A 11+interface 1.

Step S450: After the foregoing tunnel forwarding table is distributed to each physical network element, the traffic flow enters the edge physical network element A in the virtual network element, the redirection service enabled flag and a redirection tunnel ID are obtained from an attribute table of an interface 1 of the physical network element A, and then the redirection tunnel forwarding table is searched such that a packet in the traffic flow is sent from an interface 2 of the physical network element A to an interface 1 of a physical network element D, with a label 100 encapsulated.

Step S460: The physical network element D searches the redirection tunnel forwarding table according to a packet label value and the interface 1 over which the packet in the traffic flow enters the physical network element D such that the packet in the traffic flow is sent from an interface 2 of the physical network element D to a physical network element B, with a label 200 encapsulated.

Step S470: When the packet enters the physical network element B, search the redirection tunnel forwarding table according to the packet label value and an interface 1 over which the packet enters the physical network element B, and decapsulate tunnel encapsulation according to a tunnel termination flag in the redirection tunnel forwarding table, and then send out the packet from an interface 2 of the physical network element B.

It should be understood that packet encapsulation and a forwarding process that are of the protection path are similar to those of the redirection path, and details are not described herein again.

FIG. 5 is a schematic flowchart of a traffic flow forwarding path redirection method according to an embodiment of the present application. The method of FIG. 5 includes the following steps.

Step S510: A first physical network element in a virtual network element receives, from a redirection apparatus, information about a redirection path and information about a protection path, where the redirection path and the protection path are established between an inbound interface of a start physical network element and an outbound interface of an end physical network element according to a topological relationship of multiple physical network elements in the virtual network element and a redirection parameter, the redirection parameter is used to indicate the inbound interface of the start physical network element and the outbound interface of the end physical network element, the multiple physical network elements include the start physical network element and the end physical network element, and the first physical network element is the start physical network element.

Step S520: The first physical network element determines a link status of the redirection path, and when the link status of the redirection path is unavailable, specifies the protection path as a new redirection path.

In this embodiment of the present application, the first physical network element determines the redirection path and the protection path using the redirection parameter. When the redirection path is faulty or link communication quality deteriorates and reaches a preset threshold, the traffic flow can be switched to the protection path in time. This ensures continuity of traffic flow forwarding.

Optionally, as an embodiment, the link status of the redirection path includes a faulty state and/or a congested state of a link between at least two physical network elements on the redirection path, and the at least two physical network elements on the redirection path are a subset of the multiple physical network elements.

The foregoing describes in detail a traffic flow forwarding path redirection method in the embodiments of the present application with reference to FIG. 1 to FIG. 5. The following describes in detail a traffic flow forwarding path redirection apparatus in the embodiments of the present application with reference to FIG. 6 to FIG. 10.

FIG. 6 is a schematic block diagram of a traffic flow forwarding path redirection apparatus according to an embodiment of the present application. An apparatus 600 shown in FIG. 6 includes a first determining module 610, a first generation module 620, a second generation module 630, and a first sending module 640.

The first determining module 610 is configured to determine a redirection parameter of a virtual network element through which a traffic flow passes, where the virtual network element includes multiple physical network elements, the redirection apparatus 600 is configured to redirect a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element.

The first generation module 620 is configured to establish, according to a topological relationship of the multiple physical network elements in the virtual network element, a redirection path that is used to forward the traffic flow and that is between the inbound interface of the start physical network element and the outbound interface of the end physical network element that are determined by the first determining module 610.

The second generation module 630 is configured to generate tunnel forwarding information of the redirection path, where the tunnel forwarding information includes a first packet label corresponding to each physical network element in at least two physical network elements on the redirection path, and the at least two physical network elements on the redirection path are a subset of the multiple physical network elements.

The first sending module 640 is configured to send, to the at least two physical network elements on the redirection path, the first packet labels that are generated by the second generation module 630 and that are respectively corresponding to the at least two physical network elements such that the at least two physical network elements on the redirection path forward a packet in the traffic flow on the redirection path in a tunnel manner.

In this embodiment of the present application, the redirection path and tunnel information of the redirection path can be automatically determined according to the obtained redirection parameter such that the traffic flow can be forwarded on the redirection path in a tunnel forwarding manner, without a need to manually and separately modify a configuration parameter of each physical network element on the redirection path. This simplifies a traffic flow redirection process in the virtual network element.

Optionally, as an embodiment, the apparatus 600 shown in FIG. 6 may further include a third generation module (not shown) configured to establish, according to the topological relationship of the multiple physical network elements in the virtual network element and the redirection parameter, a protection path between the inbound interface of the start physical network element and the outbound interface of the end physical network element, where the protection path is used to forward the traffic flow when a link status of the redirection path is unavailable, a fourth generation module (not shown) configured to generate tunnel forwarding information of the protection path, where the tunnel forwarding information of the protection path includes a second packet label corresponding to each physical network element in at least two physical network elements on the protection path, and the at least two physical network elements on the protection path are a subset of the multiple physical network elements, and a second sending module (not shown) configured to send the second packet labels respectively corresponding to the at least two physical network elements on the protection path such that the at least two physical network elements on the protection path forward the packet in the traffic flow on the protection path in the tunnel manner when the link status of the redirection path is unavailable.

Optionally, as an embodiment, the first generation module 620 is further configured to establish, according to the topological relationship of the multiple physical network elements in the virtual network element, the redirection parameter, and a link status between the physical network elements in the virtual network element, the redirection path that is used to forward the traffic flow and that is between the inbound interface of the start physical network element and the outbound interface of the end physical network element, where the link status includes a faulty state and/or a congested state of a link between the multiple physical network elements in the virtual network element.

Optionally, as an embodiment, the first packet label includes a first packet label of an inbound interface of each physical network element on the redirection path and/or a first packet label of an outbound interface of each physical network element on the redirection path, and the second packet label includes a second packet label of an inbound interface of each physical network element on the protection path and/or a second packet label of an outbound interface of each physical network element on the protection path.

Optionally, as an embodiment, the apparatus 600 may be a centralized controller of a network in which the virtual network element locates. It should be understood that the apparatus 600 may also be deployed in any physical network element in the virtual network element.

It should be understood that the apparatus 600 shown in FIG. 6 can implement all steps in FIG. 2. To avoid repetition, details are not described herein again.

Figure 7:
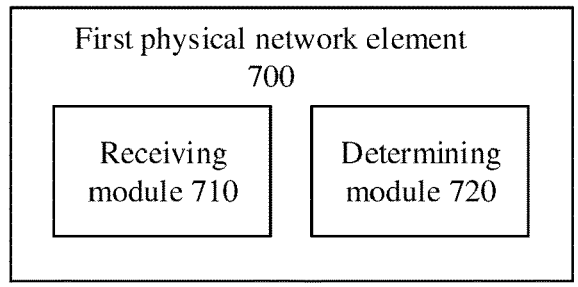
FIG. 7 is a schematic block diagram of a first physical network element for redirecting a traffic flow forwarding path according to an embodiment of the present application.

FIG. 7 is a schematic block diagram of a first physical network element 700 for redirecting a traffic flow forwarding path according to an embodiment of the present application. The first physical network element 700 of FIG. 7 includes a receiving module 710 and a determining module 720.

The receiving module 710 is configured to receive, from a redirection apparatus, information about a redirection path and information about a protection path, where the redirection path and the protection path are established between an inbound interface of a start physical network element and an outbound interface of an end physical network element according to a topological relationship of multiple physical network elements in a virtual network element and a redirection parameter, the redirection parameter is used to indicate the inbound interface of the start physical network element and the outbound interface of the end physical network element, the multiple physical network elements include the start physical network element and the end physical network element, and the first physical network element 700 is the start physical network element.

The determining module 720 is configured to determine a link status of the redirection path, and when the link status of the redirection path is unavailable, specify the protection path as a new redirection path.

In this embodiment of the present application, the first physical network element 700 determines the redirection path and the protection path using the redirection parameter. When the redirection path is faulty or link communication quality deteriorates and reaches a preset threshold, the traffic flow can be switched to the protection path in time. This ensures continuity of traffic flow forwarding.

Optionally, as an embodiment, the link status of the redirection path includes a faulty state and/or a congested state of a link between at least two physical network elements on the redirection path, and the at least two physical network elements on the redirection path are a subset of the multiple physical network elements.

For an operation/function of each module of the first physical network element 700, refer to the foregoing method in FIG. 5. To avoid repetition, details are not described herein again.

Figure 8:
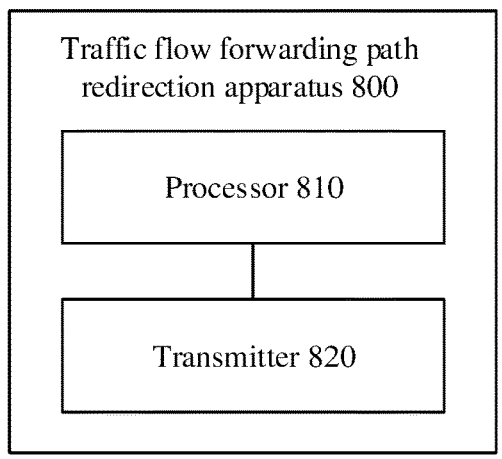
FIG. 8 is a schematic block diagram of a traffic flow forwarding path redirection apparatus according to an embodiment of the present application.

FIG. 8 is a schematic block diagram of a traffic flow forwarding path redirection apparatus 800 according to an embodiment of the present application. The traffic flow forwarding path redirection apparatus 800 shown in FIG. 8 includes a processor 810 configured to determine a redirection parameter of a virtual network element through which a traffic flow passes, where the virtual network element includes multiple physical network elements, the processor 810 redirects a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element, establish, according to a topological relationship of the multiple physical network elements in the virtual network element and the redirection parameter, a redirection path that is used to forward the traffic flow and that is between the inbound interface of the start physical network element and the outbound interface of the end physical network element, and generate tunnel forwarding information of the redirection path, where the tunnel forwarding information includes a first packet label corresponding to each physical network element in at least two physical network elements on the redirection path, and the at least two physical network elements on the redirection path are a subset of the multiple physical network elements, and a transmitter 820 configured to send, to the at least two physical network elements on the redirection path, the first packet labels generated by the processor 810 corresponding to the at least two physical network elements such that the at least two physical network elements on the redirection path forward a packet in the traffic flow on the redirection path in a tunnel manner.

In this embodiment of the present application, the redirection path and tunnel information of the redirection path can be automatically determined according to the obtained redirection parameter such that the traffic flow can be forwarded on the redirection path in a tunnel forwarding manner, without a need to manually and separately modify a configuration parameter of each physical network element on the redirection path. This simplifies a traffic flow redirection process in the virtual network element.

Optionally, as an embodiment, the processor 810 may further be configured to establish a protection path between the inbound interface of the start physical network element and the outbound interface of the end physical network element according to the topological relationship of the multiple physical network elements in the virtual network element and the redirection parameter, where the protection path is used to forward the traffic flow when a link status of the redirection path is unavailable. The processor 810 is configured to generate tunnel forwarding information of the protection path, where the tunnel forwarding information of the protection path includes a second packet label corresponding to each physical network element in at least two physical network elements on the protection path, and the at least two physical network elements on the protection path are a subset of the multiple physical network elements. The transmitter 820 is configured to send, to the at least two physical network elements on the protection path, the second packet labels respectively corresponding to the at least two physical network elements such that the at least two physical network elements on the protection path forward a packet in the traffic flow on the protection path in the tunnel manner when the link status of the redirection path is unavailable.

Optionally, as an embodiment, the processor 810 is further configured to establish, according to the topological relationship of the multiple physical network elements in the virtual network element, the redirection parameter, and a link status between the physical network elements in the virtual network element, the redirection path that is used to forward the traffic flow and that is between the inbound interface of the start physical network element and the outbound interface of the end physical network element, where the link status includes a faulty state and/or a congested state of a link between the multiple physical network elements in the virtual network element.

Optionally, as an embodiment, the first packet label includes a first packet label of an inbound interface of each physical network element on the redirection path and/or a first packet label of an outbound interface of each physical network element on the redirection path, and the second packet label includes a second packet label of an inbound interface of each physical network element on the protection path and/or a second packet label of an outbound interface of each physical network element on the protection path.

Optionally, as an embodiment, the traffic flow forwarding path redirection apparatus 800 may be a centralized controller of a network in which the virtual network element locates.

Figure 9:
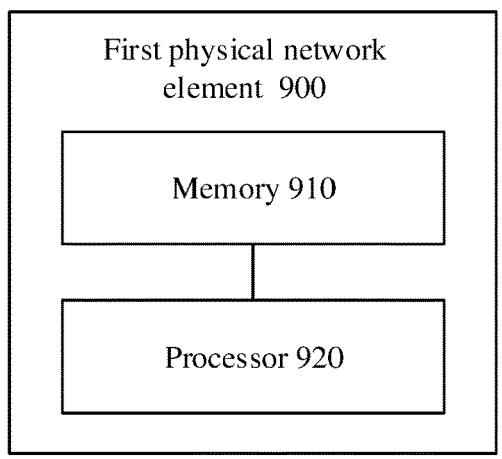
FIG. 9 is a schematic block diagram of a first physical network element according to an embodiment of the present application.

FIG. 9 is a schematic block diagram of a first physical network element 900 according to an embodiment of the present application. The first physical network element 900 shown in FIG. 9 may be a start physical network element of a redirection path and a protection path, and the first physical network element 900 includes a memory 910 configured to store a program, and a processor 920 configured to execute a program, where when the program is executed, the processor 920 is configured to receive, from a redirection apparatus, information about a redirection path and information about a protection path, where the redirection path and the protection path are established between an inbound interface of a start physical network element and an outbound interface of an end physical network element according to a topological relationship of multiple physical network elements in the virtual network element and a redirection parameter, the redirection parameter is used to indicate the inbound interface of the start physical network element and the outbound interface of the end physical network element, the multiple physical network elements include the start physical network element and the end physical network element, and the first physical network element 900 is the start physical network element of the redirection path and the protection path.

The processor 920 is further configured to determine a link status of the redirection path, and when the link status of the redirection path is unavailable, specify the protection path as a new redirection path.

In this embodiment of the present application, the first physical network element 900 determines the redirection path and the protection path using the redirection parameter. When the redirection path is faulty or link communication quality deteriorates and reaches a preset threshold, the traffic flow can be switched to the protection path in time. This ensures continuity of traffic flow forwarding.

Optionally, as an embodiment, the link status of the redirection path includes a faulty state and/or a congested state of a link between at least two physical network elements on the redirection path, and the at least two physical network elements on the redirection path are a subset of the multiple physical network elements.

Figure 10:
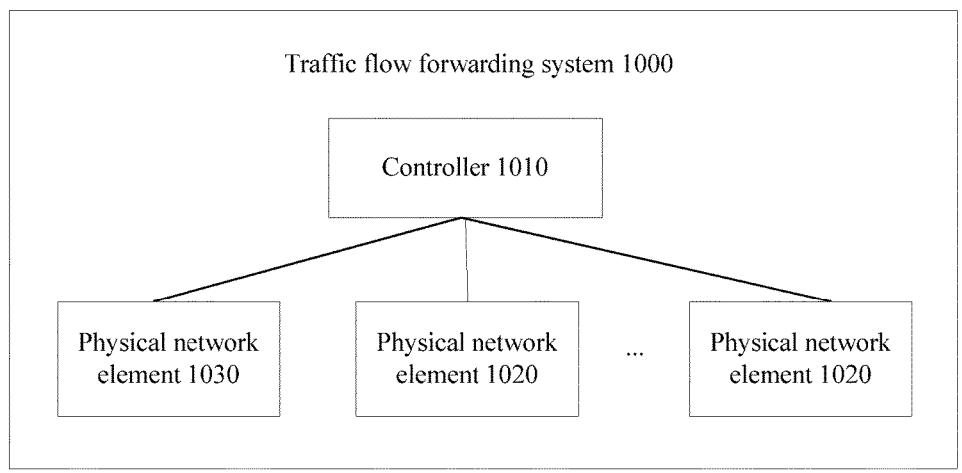
FIG. 10 is a schematic block diagram of a traffic flow forwarding system according to an embodiment of the present application.

FIG. 10 is a schematic block diagram of a traffic flow forwarding system 1000 according to an embodiment of the present application. The traffic flow forwarding system 1000 in FIG. 10 can implement all steps in FIG. 2. To avoid repetition, details are not described herein again. The traffic flow forwarding system 1000 includes a controller 1010 configured to determine a redirection parameter of a virtual network element through which a traffic flow passes, where the virtual network element includes multiple physical network elements, the controller 1010 is configured to redirect a current forwarding path that is of the traffic flow and that is in the multiple physical network elements, the redirection parameter is used to indicate an inbound interface of a start physical network element on the current forwarding path and an outbound interface of an end physical network element on the current forwarding path, and the multiple physical network elements include the start physical network element and the end physical network element, establish, according to a topological relationship of the multiple physical network elements in the virtual network element and the redirection parameter, a redirection path that is used to forward the traffic flow and that is between the inbound interface of the start physical network element and the outbound interface of the end physical network element, generate tunnel forwarding information of the redirection path, where the tunnel forwarding information of the redirection path includes a first packet label corresponding to each physical network element in at least two physical network elements on the redirection path, and the at least two physical network elements on the redirection path are a subset of the multiple physical network elements, and send, to the at least two physical network elements on the redirection path, the first packet labels respectively corresponding to the at least two physical network elements such that the at least two physical network elements on the redirection path forward a packet in the traffic flow on the redirection path in a tunnel manner.

The traffic flow forwarding system 1000 further includes a physical network element 1030 located on the redirection path configured to execute the method shown in FIG. 5. Details are not described herein again.

Optionally, the traffic flow forwarding system 1000 further includes a physical network element 1020 located on the redirection path configured to forward the packet in the traffic flow on the redirection path in the tunnel manner according to the received packet label.

It should be understood that in the embodiments of the present application, "B corresponding to A" indicates that B is associated with A, and B can be determined according to A. However, it should further be understood that determining B according to A does not mean that B is determined only according to A, and B may also be determined according to A and/or other information.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the present application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A traffic flow forwarding path redirection method, comprising:

determining, by a redirection apparatus, a redirection parameter of a virtual network element through which a traffic flow passes, wherein the virtual network element comprises a plurality of physical network elements, wherein the redirection apparatus is configured to redirect a current forwarding path of the traffic flow in the plurality of physical network elements, wherein the redirection parameter indicates an inbound interface of a start physical network element on the current forwarding path and an outbound interface of an end physical network element on the current forwarding path, and wherein the plurality of physical network elements comprise the start physical network element and the end physical network element;

establishing, by the redirection apparatus according to a topological relationship of the plurality of physical network elements in the virtual network element and the redirection parameter, a redirection path to forward the traffic flow between the inbound interface of the start physical network element and the outbound interface of the end physical network element;

generating, by the redirection apparatus, tunnel forwarding information of the redirection path comprising a first packet label corresponding to each physical network element in at least two physical network elements on the redirection path, wherein the at least two physical network elements on the redirection path are a subset of the plurality of physical network elements; and sending, by the redirection apparatus to the at least two physical network elements on the redirection path, first packet labels respectively corresponding to the at least two physical network elements.

2. The method according to claim 1, further comprising:

establishing, by the redirection apparatus according to the topological relationship of the plurality of physical network elements in the virtual network element and the redirection parameter, a protection path between the inbound interface of the start physical network element and the outbound interface of the end physical network element, wherein the protection path forwards the traffic flow when a link status of the redirection path is unavailable;

generating, by the redirection apparatus, tunnel forwarding information of the protection path, wherein the tunnel forwarding information of the protection path comprises a second packet label corresponding to each physical network element in at least two physical network elements on the protection path, and wherein the at least two physical network elements on the protection path are another subset of the plurality of physical network elements; and sending, by the redirection apparatus to the at least two physical network elements on the protection path, the second packet labels respectively corresponding to the at least two physical network elements on the protection path.

3. The method according to claim 1, wherein establishing the redirection path comprises establishing, by the redirection apparatus according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, wherein the link status comprises a faulty state and a congested state of a link among the plurality of physical network elements in the virtual network element.

4. The method according to claim 1, wherein establishing the redirection path comprises establishing, by the redirection apparatus according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, wherein the link status comprises a faulty state of a link among the plurality of physical network elements in the virtual network element.

5. The method according to claim 1, wherein establishing the redirection path comprises establishing, by the redirection apparatus according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, wherein the link status comprises a congested state of a link among the plurality of physical network elements in the virtual network element.

6. The method according to claim 2, wherein the first packet label comprises a first packet label of an inbound interface of each physical network element on the redirection path and a first packet label of an outbound interface of each physical network element on the redirection path, and wherein the second packet label comprises a second packet label of an inbound interface of each physical network element on the protection path and a second packet label of an outbound interface of each physical network element on the protection path.

7. The method according to claim 2, wherein the first packet label comprises a first packet label of an inbound interface of each physical network element on the redirection path or a first packet label of an outbound interface of each physical network element on the redirection path, and wherein the second packet label comprises a second packet label of an inbound interface of each physical network element on the protection path or a second packet label of an outbound interface of each physical network element on the protection path.

8. The method according to claim 1, wherein the redirection apparatus comprises a centralized controller of a network in which the virtual network element locates.

9. A traffic flow forwarding path redirection apparatus, comprising:
 a non-transitory memory storing instructions; and
 a processor coupled to the non-transitory memory, wherein the instructions cause the processor to be configured to:
  determine a redirection parameter of a virtual network element through which a traffic flow passes, wherein the virtual network element comprises a plurality of physical network elements, wherein the redirection parameter indicates an inbound interface of a start physical network element on a current forwarding path and an outbound interface of an end physical network element on the current forwarding path, and wherein the plurality of physical network elements comprise the start physical network element and the end physical network element;
  establish, according to a topological relationship of the plurality of physical network elements in the virtual network element and the redirection parameter, a redirection path to forward the traffic flow between the inbound interface of the start physical network element and the outbound interface of the end physical network element;
  generate tunnel forwarding information of the redirection path, wherein the tunnel forwarding information of the redirection path comprises a first packet label corresponding to each physical network element in at least two physical network elements on the redirection path, and wherein the at least two physical network elements on the redirection path are a subset of the plurality of physical network elements; and
  send, to the at least two physical network elements on the redirection path, first packet labels respectively corresponding to the at least two physical network elements.

10. The redirection apparatus according to claim 9, wherein the instructions further cause the processor to be configured to:
 establish, according to the topological relationship of the plurality of physical network elements in the virtual network element and the redirection parameter, a protection path between the inbound interface of the start physical network element and the outbound interface of the end physical network element, wherein the protection path forwards the traffic flow when a link status of the redirection path is unavailable;
 generate tunnel forwarding information of the protection path, wherein the tunnel forwarding information of the protection path comprises a second packet label corresponding to each physical network element in at least two physical network elements on the protection path, and wherein the at least two physical network elements on the protection path are another subset of the plurality of physical network elements; and
 send, to the at least two physical network elements on the protection path, second packet labels respectively corresponding to the at least two physical network elements.

11. The redirection apparatus according to claim 9, wherein the instructions further cause the processor to be configured to establish, according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, and wherein the link status comprises a faulty state and a congested state of a link among the plurality of physical network elements in the virtual network element.

12. The redirection apparatus according to claim 9, wherein the instructions further cause the processor to be configured to establish, according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, and wherein the link status comprises a faulty state of a link among the plurality of physical network elements in the virtual network element.

13. The redirection apparatus according to claim 9, wherein the instructions further cause the processor to be configured to establish, according to the topological relationship of the plurality of physical network elements in the virtual network element, the redirection parameter, and a link status among the plurality of physical network elements in the virtual network element, the redirection path to forward the traffic flow between the inbound interface of the start physical network element and the outbound interface of the end physical network element, and wherein the link status comprises a congested state of a link among the plurality of physical network elements in the virtual network element.

14. The redirection apparatus according to claim 10, wherein the first packet label comprises a first packet label of an inbound interface of each physical network element on the redirection path and a first packet label of an outbound interface of each physical network element on the redirection path, and wherein the second packet label comprises a second packet label of an inbound interface of each physical network element on the protection path and a second packet label of an outbound interface of each physical network element on the protection path.

15. The redirection apparatus according to claim 10, wherein the first packet label comprises a first packet label of an inbound interface of each physical network element on the redirection path or a first packet label of an outbound interface of each physical network element on the redirection path, and wherein the second packet label comprises a second packet label of an inbound interface of each physical network element on the protection path or a second packet label of an outbound interface of each physical network element on the protection path.

16. The redirection apparatus according to claim 9, comprising a centralized controller deployed in the virtual network element.

17. A first physical network element, comprising:
a non-transitory memory storing instructions; and
a processor coupled to the non-transitory memory, wherein the instructions cause the processor to be configured to:
receive, from a redirection apparatus, information about a redirection path and information about a protection path, wherein the redirection path and the protection path are established between an inbound interface of a start physical network element and an outbound interface of an end physical network element according to a topological relationship of a plurality of physical network elements in a virtual network element and a redirection parameter, wherein the redirection parameter indicates the inbound interface of the start physical network element and the outbound interface of the end physical network element, wherein the plurality of physical network elements comprise the start physical network element and the end physical network element, and wherein the first physical network element comprises the start physical network element;
determine a link status of the redirection path; and
specify the protection path as a new redirection path when the link status of the redirection path is unavailable.

18. The physical network element according to claim 17, wherein the link status of the redirection path comprises a faulty state and a congested state of a link between at least two physical network elements on the redirection path, and wherein the at least two physical network elements on the redirection path are a subset of the plurality of physical network elements.

19. The physical network element according to claim 17, wherein the link status of the redirection path comprises a faulty state of a link between at least two physical network elements on the redirection path, and wherein the at least two physical network elements on the redirection path are a subset of the plurality of physical network elements.

20. The physical network element according to claim 17, wherein the link status of the redirection path comprises a congested state of a link between at least two physical network elements on the redirection path, and wherein the at least two physical network elements on the redirection path are a subset of the plurality of physical network elements.

* * * * *